Figure 1:
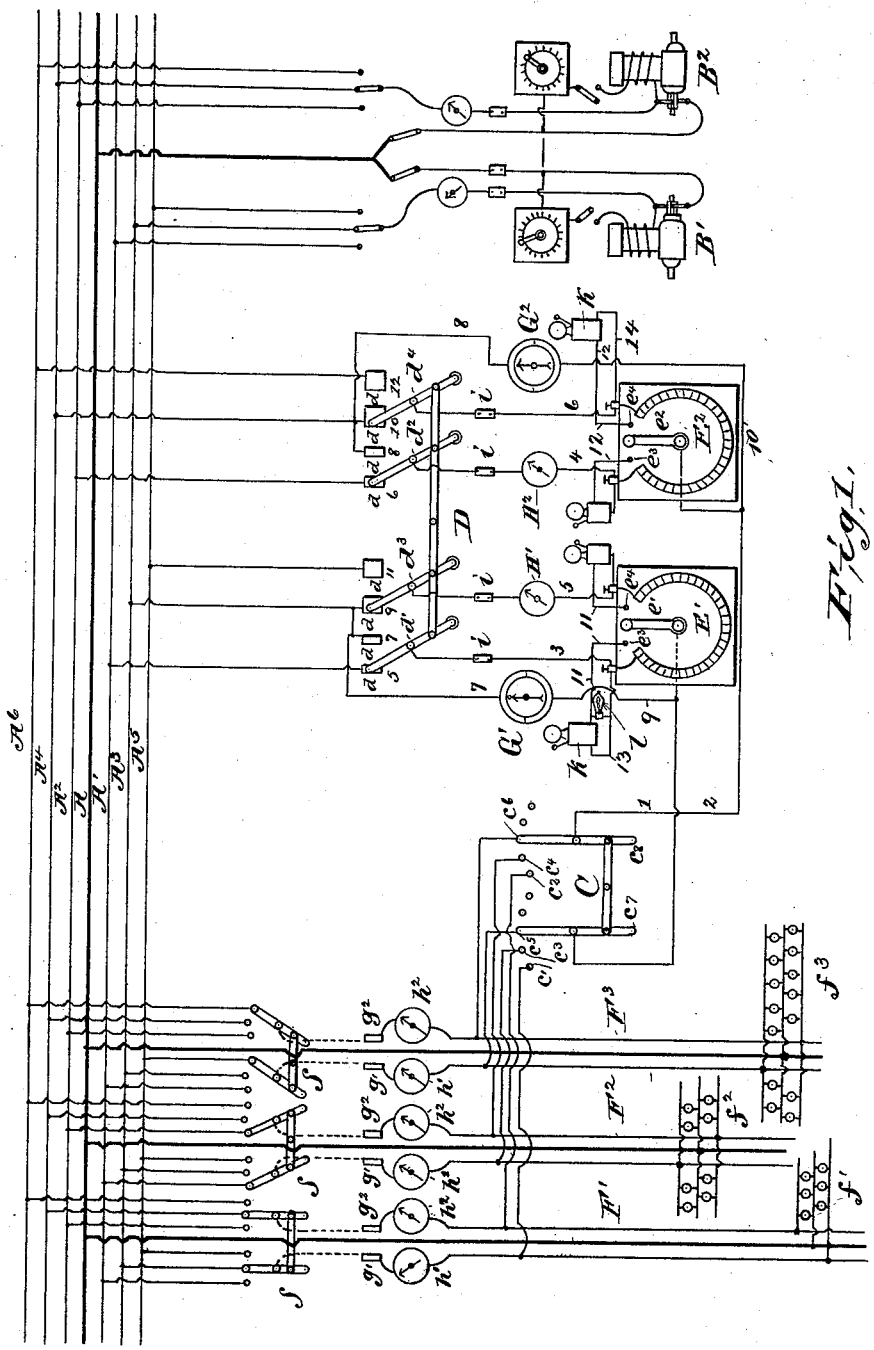

(No Model.) 2 Sheets—Sheet 1.

C. O. MAILLOUX & W. S. BARSTOW.
SYSTEM OF ELECTRICAL DISTRIBUTION.

No. 506,921. Patented Oct. 17, 1893.

Attest:
C. W. Benjamin
W. H. Capel.

Inventors:
Cyprien O. Mailloux
William S. Barstow
by J. L. Townsend
atty (No Model.) 2 Sheets—Sheet 2.

C. O. MAILLOUX & W. S. BARSTOW.
SYSTEM OF ELECTRICAL DISTRIBUTION.

No. 506,921. Patented Oct. 17, 1893.

Attest:
C. W. Benjamin.
Wm. H. Capel.

Inventors:
Cyprien O. Mailloux
William S. Barstow
by H. C. Townsend
Atty

UNITED STATES PATENT OFFICE.

CYPRIEN O. MAILLOUX, OF NEW YORK, AND WILLIAM S. BARSTOW, OF BROOKLYN, NEW YORK.

SYSTEM OF ELECTRICAL DISTRIBUTION.

SPECIFICATION forming part of Letters Patent No. 506,921, dated October 17, 1893.

Application filed June 23, 1893. Serial No. 478,568. (No model.)

*To all whom it may concern:*

Be it known that we, CYPRIEN O. MAILLOUX, a resident of New York, county of New York, and WILLIAM S. BARSTOW, a resident of Brooklyn, county of Kings, State of New York, citizens of the United States, have invented a certain new and useful System of Electrical Distribution, of which the following is a specification.

Our invention relates to that class of electric apparatus or systems which comprise feeders, consumption circuits, bus-bars or similar sources of electrical energy of different or graded potential to which said feeders are connected, and feeder switches for shifting feeders from a bus-bar or source of one potential to a bus-bar or source of another potential as conditions of electric load of the system may require.

The object of our invention is to provide a simple and effective means or method of shifting whereby disturbances of the electric load or injury or derangement of any part of the apparatus or system may be avoided.

Our invention avoids the necessity of entirely disconnecting the feeder from the source in the operation of transfer which is objectionable because it temporarily cuts off the supply from the consumption circuits and lamps or other devices, besides producing violent changes in the engine load when the source of energy is an electric dynamo or dynamos.

Our invention further avoids any sudden change in the luminosity of the lamps or behavior of other translating devices on the consumption circuits as well as other dangerous and destructive results in large stations which follow the attempt to make the transfer of the feeder by an ordinary "continuity preserving" operation which involves a momentary simultaneous connection of the feeder to two bus bars of different potential.

One of the features of our invention consists in connecting the feeder which is to be transferred to a branch or tap leading from a suitable source and containing an artificial resistance, varying the resistance until the electric load in the tap or branch is the same as the load on the feeder while connected both to the bus direct and to the tap so that no change will be produced by disconnecting the bus and feeder, then disconnecting from the bus, and varying the resistance until the potential of the feeder is brought to the bus to which it is to be transferred.

Our invention consists further in other features relating to the manner of transferring a feeder from one bus-bar to another and the means for effecting the transfer as more particularly hereinafter described, and then specified in the claims.

Figure 2:
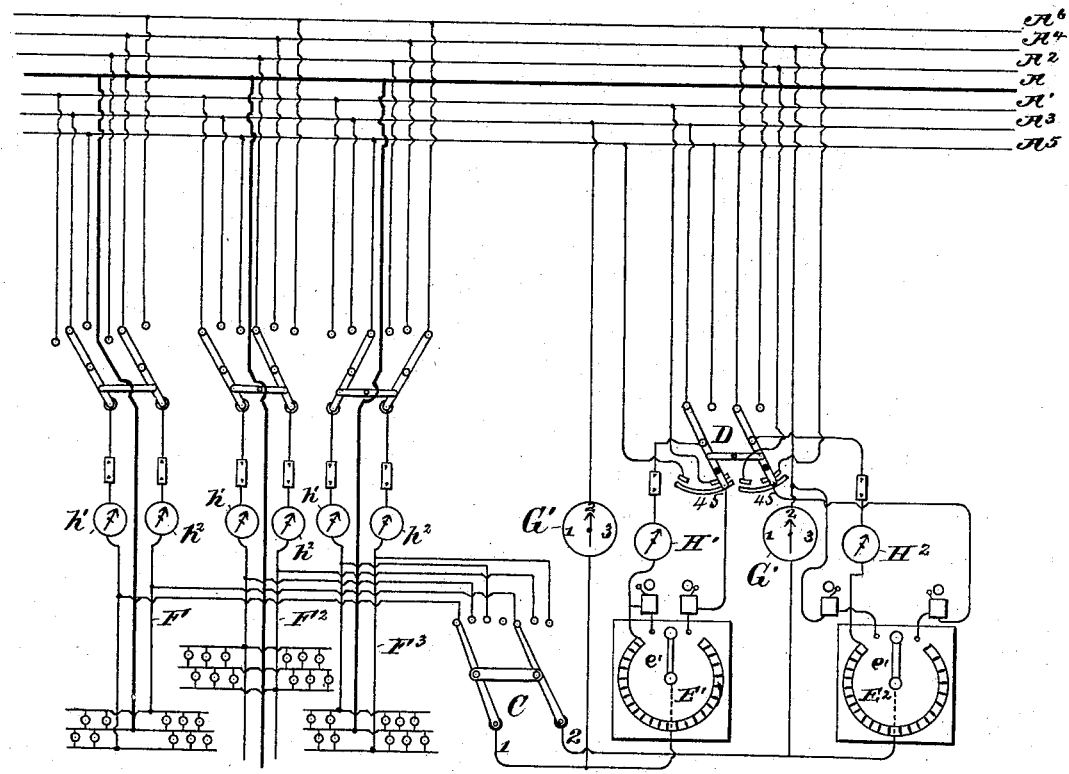
Figure 3:
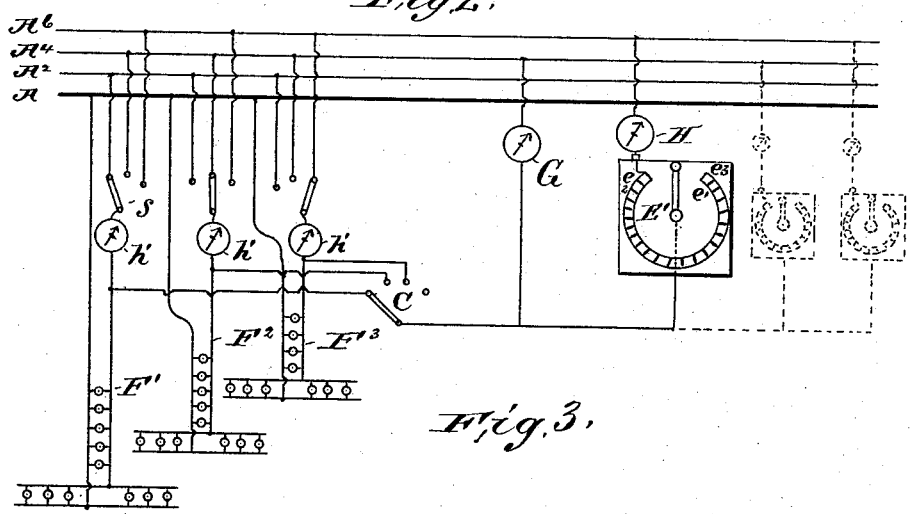

In the accompanying drawings:—Figure 1, is a general diagram of an apparatus embodying our invention and suitable for effecting a transfer in the manner hereinafter described. Fig. 2, is a diagram of a simplified apparatus. Fig. 3, is a diagram of a further modification.

Fig. 1, represents our invention as applied to a station using the three wire system. We have herein shown the station as equipped with bus-bars supplying respectively three different potentials but, as will be well understood, the invention is likewise applicable to a greater number of bus-bars or potentials or to a less number as, for instance, two. It will also be understood that some of the features of our invention are applicable to a single wire system as well as to systems in which the three wire system is extended to four or five wires with corresponding neutral wires or connections.

In Fig. 1, A, is the neutral bus-bar; $A^3$, $A^5$, are bus-bars of one polarity though of different potentials and $A^4$, $A^6$, are two auxiliary bus-bars of contrary polarity and of different potentials. In practice the potential at any bar of one polarity differs from that contiguous thereto by from five to twenty-five volts, according to conditions. While we have shown two auxiliary bus-bars of each polarity, we desire to have it understood that any number can be used. The different potentials for the regular and the auxiliary bus-bars may be produced in many ways. In the drawings we show dynamo electric machines $B'$, $B^2$, &c., of the usual constant potential type connected between the neutral wire and each individual bus in the well known way as practiced in central stations operating the "Edison" constant potential system. We show but two of the bank of machines similarly arranged and connected to switches, and others are to be provided in sufficient number to supply all the bus-bars.

In a separate application for patent filed by us April 27, 1893, Serial No. 472,033, we have shown other ways whereby these potentials may be derived from one initial source of potential by the interposition of auxiliary electro-dynamic machines acting to raise or lower the said initial potential.

In Fig. 1, we show three sets of three wire feeders $F'$, $F^2$, $F^3$, which convey current from the station to the mains or consumption circuits $f'$, $f^2$, $f^3$, for electric lamps or other translating devices each bus supplying any number of feeders or sets of feeders desired. Each set of feeders is provided as usual with positive and negative fuses $g'$, $g^2$; ampère meters $h'$, $h^2$, and also with a switch S, for connecting it with the bus-bars. In this case, however, this switch, which we call hereinafter the feeder switch, is constructed in such manner that it can be used to connect at will the corresponding feeder with any pair of bus-bars A, $A^2$, as shown in the case of feeder $F^2$, or bus-bars $A^3$, $A^4$, (feeder F,) or bus-bars $A^5$, $A^6$, (feeder $F^3$.)

In addition to the above connections each feeder terminal also connects with a switch C. As shown in the drawings, the switch C, has its movable arms $c^7$, $c^8$, in connection by the leads 1, 2, with the movable arms $e'$, $e^2$, of a pair of rheostats $E'$, $E^2$, hereinafter mentioned. The contact points of the switch C, are in electrical connection with the feeders except the neutral wire (in three wire system or the common return wire in two wire system) which does not connect with switch C. Thus the positive and negative leads of feeder $F'$, connect with switch contacts $c'$, $c^2$, those of feeder $F^2$, with contacts $c^3$, $c^4$, those of feeder $F^3$, with contacts $c^5$, $c^6$, and so on for any number of feeders, there being a pair of contacts for each pair of leads (positive and negative) of every feeder starting from the station. This switch merely serves the purpose of connecting a feeder terminal to the circuits and apparatus used in the transfer operation and may be indefinitely varied in construction and arrangement as will be well understood by electricians.

The transfer rheostats $E'$, $E^2$, are shown of the regular circular dial type, but may be of any form. It is desirable, however, that the contact arm $c^2$, be arranged so that it can leave contact with the dial at either end of the resistance ($e^3$, or $e^4$). The first and last contacts are connected by leads (3, 5, and 4, 6), with the contact arms ($d'$, $d^3$, $d^2$, $d^4$, respectively), of a switch D, whose stationary contacts connect with the bus-bars as follows—$d^5$, to $A'$; $d^7$, $d^9$ to $A^3$; $d^2$, to $A^5$; $d^6$, to $A^2$; $d^8$, $d^{10}$, to $A^4$; $d^{12}$, to $A^6$. The circuit connections 3, 5, 4, 6, include fuses or cut-out devices $i$, $i$, and ampère meters $H'$, $H^2$. The contacts and connections provided by this switch permit the connection of the terminal of the rheostat to any two of the bus-bars and also serve to break a connection of one terminal with its bus-bar leaving the other connected. This switch may be indefinitely varied in construction and under some conditions it would not be necessary to provide for shifting the terminals of the rheostat to different bus-bars, the connection being in such case always with the same bus-bar. The special construction of switch shown merely provides in the same mechanism the means of shifting and of making and breaking connection.

The switch contacts $d^7$, $d^9$, and $d^8$, $d^{10}$, are connected by wires 7 and 8, respectively, each circuit with a voltmeter or galvanometer $G'$, $G^2$, the connections from the other terminals of which are continued by wires 9, 10, to the feeder transfer connections 1, 2, respectively. When thus connected the voltmeters or galvanometers must be polarized and arranged so as to read both ways from the zero point. They may be connected to contacts $d^5$ and $d^6$, or $d^{11}$, and $d^{12}$, instead of $d^7$, $d^9$, and $d^8$, $d^{10}$, in which case the voltmeter may be of the ordinary description adapted to read only one way. The arrangement shown is preferred because the voltmeter then stands at zero when both its terminals are connected to the middle bus-bar which is usually the main station potential; and indicates the rise or fall of potential when one of its terminals becomes transferred to any of the other bus-bars. The rheostats $E'$, $E^2$, are provided each with an additional pair of contacts $e^3$, $e^4$, insulated from the others and so disposed that the moving arm $e'$, will come in contact with either the one or the other (according to the direction it moves in) before coming into contact with the regular resistance contacts. These single contacts are connected by wires 11, 12, respectively, to an alarm device such as an electric bell $k$, or lamp $l$, the connection being continued by wires 13, 14, respectively to the transfer circuit wires 1, 2, respectively.

As an illustration of the one method of transfer by the use of the hereinabove described apparatus, let it be desired to transfer a feeder (such as $F^2$), connected with the bus-bars $A'$, $A^2$, of lowest potential to other bus-bars $A^3$, $A^4$, of higher intermediate potential. The switch C, is first moved so as to bring the leads 1 and 2, into connection with the contacts $c^3$, $c^4$, which join the feeder $F^2$, at the points shown on the drawings thereby bringing the feeder terminal into connection with the moving contact arms of the transfer resistance $E'$, $E^2$, which are in the position shown in the drawings, that is to say, not connected with either end of the resistance. The switch D, is now moved so as to connect in the position shown in the drawings. By this operation the resistance at the rheostat $E'$, $E^2$, becomes connected across between the bus-bars A', A³ and A², A⁴, respectively, as may be seen from following out the circuits. It should be noted that the stationary contacts $d^9$, $d^{10}$, of the transfer switch D, are wider than others and are so disposed that they make contact first when the switch is moved to the position shown. The contacts $d^{11}$, and $d^{12}$, are also wider and are disposed so as to make contact first when the switch is moved in the opposite direction. By the closing of the switch C, a circuit connection is made through the voltmeters G', G². In the case assumed the feeder F², being connected with the bus-bar of lowest potential while the contacts $d^9$, $d^{10}$, respectively, are at the intermediate potential, it will readily be understood by following the circuits that the galvanometers or voltmeters G', G², will be submitted to a difference of potential equal to that existing between said bus-bars A', A², and A², A⁴. The deflection serves to indicate the amount of said difference of potential as well as its direction, that is to say, whether the potential of the feeder which is to be manipulated is higher or lower than the intermediate bus-potential; the deflection being to the left when the feeder is connected to the lowest potential and to the right when it is connected to the highest while it is at zero when it is connected to the same potential. The next step is to move the arms of the switch handles or rheostat arms $e'$, $e^2$, to put the feeder terminal in connection through the resistance with the bus-bar of a different potential from that of the bar with which said feeder is already connected. The deflection of the galvanometer gives the necessary indication from which can be determined the proper direction in which these handles are to be moved. The alarm device $k$, however, provides a safeguard by means of which any error in the motion of the switch is effectually prevented. The switch handles $e'$, $e^2$, should be moved to the same end of the resistance $e'$, $e^2$, that the feeder is connected at, namely—(in the particular case supposed)—at that end of it which is connected with the bus-bar of lowest potential. As will be seen in the figure, this is the end which is designated by the contacts $e^3$, $e^3$. Hence as the isolated contacts $e^3$, $e^3$, are at the same potential as the bus-bars A', A², to which the feeder F², is connected, the motion of the arms $e'$, $e^2$, so as to close with the contacts $e^3$, $e^3$, will cause no current to pass through the alarm devices K. If, however, the arms $e'$, $e^2$, had been moved to the right instead of to the left so as to touch the contacts $e^4$, which are in electrical connection with the bus-bars A³, A⁴, it will readily be seen that the difference of potential between the bus-bars A', A³, or A², A⁴, would have acted upon the alarm device and thereby have given notice to the operator that the switch is moved in the wrong direction. In the condition shown in the drawings, therefore, the switches must move to the left. It will be seen that as they move to the left only that resistance which is at the right of the contact arms is in circuit across the bus-bars or in circuit between the feeder terminal and the bus-bar of higher potential. The farther these arms $e'$, $e^2$, are moved the less of this resistance remains in circuit. Consequently the current which passes from the higher bus-bars A³, A⁴, to the lower potential bus-bars A', A², respectively, will greatly increase, as will be shown by the increased deflection of the ampère meters H', H². The operator keeps the arm moving until these deflections are found to be approximately equal to deflections which are shown at the ampère meters $h'$, $h^2$, of the feeder which is to be transferred. The switch $e'$, $e^2$, is then stopped in that position while the switch D, is moved so as to partially open, that is to say, so as to make it leave contact at the contact points $d^5$, $d^6$, the contacts $d^9$, $d^{10}$, owing to their shape and arrangement, still remaining connected. It will be seen that by this operation the end of the resistance E', E², which is connected to the bus-bar of lower potential A', A², has now become disconnected. In this condition the feeder F², is receiving its current from two sets of bus-bars,—directly from the bus-bars A', A², and from the bus-bars A³, A⁴, through that portion of the system which still remains interpolated at the rheostat, so as to bring the current to the proper point. As the current has been adjusted at H', H², so as to be the same as that indicated through the feeder ampère meters $h'$, $h^2$, it follows that an amount of current equal to the load of said feeder is now being taken from the higher bus-bars and conveyed to the lower bus-bars to supply in whole or in part the one or more feeders connected to said bar. In this condition the potential would be practically the same at the point of feeder connection with A', as it would be at the point where it connects with the large resistance E', E². The switch S, is now opened so as to open the direct connection between the feeder F², and the bus-bars A', A², still leaving the connection through the leads 1 and 2, switch C, leads 1 and 2, rheostats E', E², ampère meters H', H², switch D, &c., and bus-bars A³, A⁴. The rheostat handles $e'$, $e^2$, are then moved farther in the same direction as before, until the resistance in the rheostat is gradually cut out altogether which occurs when the handles reach that end of the resistance near the isolated contacts $e$, $e^4$. By this operation the resistance E', E², which served before to produce an artificial drop in the feeder F², after it was disconnected from the bus-bars A', A², has become entirely removed and the feeder F², is now at the potential of the bus-bars A², A³. The switch S, is now moved so as to connect with the contacts leading from the bus-bars A², A³, that is to say, the position shown for feeder F'. The rheostat handles E', E², are now moved so as to bring them midway between the two ends and the switches D, may now be open.

If it is desired to transfer a feeder from the intermediate potential to a higher potential the operation is the same excepting that the switch D, will have to be turned to the right instead of to the left.

In case it is desired to transfer a feeder from a bus-bar of higher to a bus-bar of lower potential, the operation is inverse and as follows:—Let us suppose that it is desired to transfer a feeder such as $F^3$, from the highest potentials $A^5$, $A^6$, to the intermediate potential $A^3$, $A^4$. The switch C, is brought into contact by contacts $c^5$, $c^6$, with the terminal of feeder $F^3$, by which operation the feeder to be transferred is brought into connection with the rheostat circuit. The switch D, is then partly moved so as to close the contacts $d^3$, $d^4$, with the stationary contacts $d^{11}$, $d^{12}$, but not far enough to close the contacts $d^7$, $d^8$. The rheostat handles $e'$, $e^2$, are then moved so as to connect with the proper end of the transfer-rheostat resistance. It will be found in this case that the alarm bell $k$, would ring if the switch were moved to the left, but would not ring if moved to the right which is the correct position. The switch S, is then opened disconnecting the feeder from a bus-bar direct at switch S but leaving its terminal connected by way of the rheostat, after which the rheostat handles $e'$, $e^2$, are moved to the right. It will be noticed that the galvanometers $G'$, $G^2$, will swing back toward zero as the resistance is gradually increased in the transfer rheostats $E'$, $E^2$. When these galvanometers or voltmeters $G'$, $G^2$, indicate zero, the condition is such that the resistance which has been added in circuit with the feeder $F^3$, is sufficient to cause a drop such that the potential difference at the points where the feeder connects with the rheostats $E'$, $E^2$, is the same as that of the intermediate bus-bars $A^3$, $A^4$. In this condition the switch D, can now be fully closed to the right so as to close $d'$, with $d^7$, and $d^2$, with $d^8$, and the switch S, may now be turned so as to connect the feeder with the intermediate bus-bars $A^3$, $A^4$, or the position shown for feeder F. The switches D and C, may now be opened, and the handles $e'$, $e^2$, turned to central position leaving the apparatus ready for the next operation. The transfer from the bus-bars $A^3$, $A^4$, to the bus-bars $A'$, $A^2$, is accomplished in the same manner with the exception that the switch D, is turned to the left instead of to the right.

Fig. 2, shows a somewhat simplified form of apparatus for practicing our invention, the switch D, being arranged to control the connection of one terminal only of the rheostat with the bus-bars. The switch serves to shift the rheostats from $A^3$ to $A^5$ and from $A^4$ to $A^6$. The connection of the alarm contacts with $A^5$ or with $A^6$, is also controlled by means of an ordinary switch attachment at 45. To transfer from a lower bus-bar as $A'$, $A^2$, to an intermediate bus-bar as $A^3$, $A^4$, proceed as follows:—Move switch C, to connect the feeder terminal with the rheostats;—move switch D, to the position shown in the drawings, thus connecting the rheostats with bus-bars $A^3$, $A^4$;—move rheostat handles $e'$, in clock-wise direction until the ampère meters give equal readings (if by mistake the attempt should be made to move the rheostat handle to the left so as to connect the feeder direct to the higher bus-bar, it is obvious that the alarm would be sounded)—disconnect feeder by switch S, from bus-bar $A'$;—continue movement of the rheostat handles cutting out resistance in a direction to raise the potential of the feeder terminal until the voltmeters connected to the middle bus-bars show zero;—connect the feeder to the bus-bars $A^3$, $A^4$, direct by the feeder switch and open switch C, and restore the arms of the rheostats to position for another operation. To shift from $A^3$ to $A^4$, and from $A^5$, to $A^6$, proceed in the same manner excepting to move switch D, to the left to connect with the higher bus-bars $A^5$, $A^6$. To shift from a higher to a lower potential bus-bar, connect the terminal of the feeder to the rheostat by switch C, and move switch D, to connect the rheostat to the bus-bar to which the feeder is connected by the feeder switch;—close the rheostat arms to the left or counter clock-wise. Should by mistake the rheostat handles be moved to the right, it is obvious that the alarm will be sounded, said alarm being connected by supplemental switches and connections at 45, with one or the other of the bus-bars of different potential from that which is to be shifted. This switch 45, also controls the connection of the alarm when the switch D, is in the opposite position and the transfer is being made in the manner first described in connection with Fig. 2. The feeder having been connected with the same bus-bar by the rheostat handles it may be disconnected from said bus-bar by the switch S;—move the rheostat arm counter-clockwise until the voltmeters indicate the potential of the bus-bar to which the transfer is to be made. If the potential indicators be on the intermediate bus-bars and the transfer is to be made to said bar, it is obvious that they will show zero. Close the transfer switch of the feeder on the bus-bars of lower potential. Open switch C, and rheostat arms as before.

Fig. 3, shows the invention applied to one side of the three wire system and in simpler form. The rheostat in this instance is supposed to be permanently connected to the bus-bar of highest potential and the switching or changes of connection necessary under different conditions are obtained by allowing the arm on the rheostat to close connection in either direction but to stand in normal position out of circuit with the rheostat itself.

The tension indicator G, may be connected to any bus-bar but preferably to the middle one. As before, the indicator G, should be polarized to read in both directions if it be connected to the intermediate bus-bar. It will be understood, however, that it might be connected to any other bus.

The operations would be briefly as follows:—To transfer the feeder from $A^2$, to $A^4$, first switch the feeder terminal by C, to arm $E'$, of the rheostat. This gives an indication at G, and shows which way the arm $e'$, should be moved;—move the rheostat arm to the right clockwise thus closing the connection at the opposite end of the resistance from that connected to $A^6$, through the whole resistance which should be of proper amount depending upon the maximum difference of potential between the bus-bar to which it is permanently connected and the lowest of the bus-bars which are concerned in any transfer operation;—the movement of the rheostat is continued to the right clockwise until the current indicated at H, equals that indicated at $h'$;—open the feeder transfer switch;—continue movement of $e'$, until the indicator G, shows a potential at the feeder terminal the same as $A^4$. This indication would now be "zero" when connected to the middle bus;—throw the feeder switch S onto the middle bus $A^4$;—open switch C, and throw arm $e'$, in either direction to open position. To transfer from $A^4$ to $A^6$, proceed in the same way. To transfer from $A^6$, to $A^4$, first connect C, to the feeder;—move arm $e'$, backward or counter clockwise until it closes the connection at $e^2$, with the bus-bar $A^6$;—open feeder switch S;—continue movement of arm $e'$, in the same direction until G, shows proper drop to give a bus-bar potential of $A^4$, on the feeder;—switch the feeder by S onto $A^4$;—open switch C, and move arm $e'$, around to open circuit position or, if desired, move arm $e'$, in the same direction first and then open C. To shift from $A^4$, to $A^2$,—close switch C, on feeder;—move rheostat handle to the right thus connecting feeder to $A^6$, through the whole resistance and continue movement clockwise until G, shows potential of $A^4$;—open switch S, disconnecting feeder from $A^4$;—move arm $e'$, back or counter clockwise to $e^3$, or to position where G, will indicate the potential of $A^2$;—close the feeder switch on $A^2$;—open $e'$, at $e^3$, and then open C.

It will be obvious to electricians that our invention is not confined to continuous current systems but might be used also in alternating current systems the character of the rheostats which are employed being properly varied for such purpose and their inductance, their capacity or impedence being changed by any of the means known in the art.

By the term "rheostat" we mean to include any device consisting of coils or lengths of conducting wire, as used ordinarily in the art, to form a dead resistance without requiring the mechanical movement of parts as is necessary in the case of an armature wound with conductors and run as the armature of an electric motor. It will be obvious also that a resistance might be similarly connected in permanent fashion to the middle bus-bar after the manner of the rheostat shown in Fig. 3, and used for transferring from bar $A^2$, to bar $A^4$, while another resistance could be permanently connected to the higher bus bar $A^6$ and used for transferring between $A^4$ and $A^6$. In these instances the resistance would not require to be of the full capacity of that shown which must be of capacity sufficient for making the transfer direct from $A^2$ to $A^6$. When the three resistances are employed, as described, each might be used as conditions should require. The connection of additional resistances as thus outlined is indicated in the dotted lines. The single resistance, however, when connected to the bus-bar of highest potential will serve the purpose of transferring either up or down from any bus bar to any other, the resistance being made of proper capacity.

It will be observed that in the case of each of the smaller resistances now referred to the permanent connection is to the highest of the two bus-bars between which transfer is to be made.

What I claim as my invention is—

1. The herein described method of transferring a feeder from one bus-bar to another, consisting in tapping said feeder onto a branch or tap leading from a source of different potential through a rheostat, varying the resistance of said tap or branch until the load indicated on said tap is the same as that indicated on the feeder, cutting off the feeder connection with its bus-bar, gradually varying the resistance until the feeder terminal reaches the bus-bar potential of the bar to which it is to be transferred and then shifting to said bar.

2. The herein described method of transferring a feeder from one bus-bar to another, consisting in tapping said feeder onto a branch or tap leading from a bus-bar of different potential through a rheostat, varying the resistance of said tap or branch until the load indicated on said tap is the same as that indicated on the feeder, cutting off the feeder connection with its bus-bar, gradually varying the resistance until the feeder terminal reaches the bus-bar potential of the bar to which it is to be transferred and then shifting to said bar.

3. The herein described method of transferring a feeder from a bus-bar of one potential to a bus-bar of another potential, consisting in connecting the feeder terminal through an artificial resistance to a bus-bar of a different potential, manipulating said resistance to bring the potential at the connection of the feeder with said resistance to the potential of the bus-bar with which the feeder is already connected, disconnecting the feeder from the latter bus-bar, varying the resistance to change the feeder terminal to the potial of the bus-bar to which it is to be transferred and then making the transfer.

4. The herein described method of transferring a feeder from a bus-bar of one potential to a bus-bar of another potential, consisting in connecting said feeder through an artificial resistance with a bus bar of a different potential, varying said artificial resistance until the terminal of the resistance connected to the feeder is brought by the drop in said resistance to the potential of the bus-bar to which the feeder is first connected, disconnecting from the latter bus, then varying the resistance until the potential is brought to that of the desired bus and transferring to said bus.

5. The herein described method of transferring a feeder terminal from a bus-bar of one potential to a bus-bar of a lower potential consisting in gradually increasing the resistance in a connection between said feeder and a bus-bar of higher potential than that to which it is to be shifted, connecting the feeder terminal to the bus-bar of lower potential and then breaking the connection with the bus bar of higher potential.

6. In a system of electrical supply, the combination with a number of sources of supply such as bus-bars of different potentials, of a number of feeders, switches for shifting said feeders at pleasure from one bus-bar or source to another, a rheostat or artificial resistance, means for connecting the same to a feeder terminal previous to the transfer, and means for varying said artificial resistance to raise or lower the potential of said feeder terminal to that of the source to which it is to be shifted.

7. The combination, substantially as described, of bus-bars of different potentials, feeder switches for transferring a feeder from one bus-bar to another, a variable resistance, means for connecting the same into circuit across different pairs of bus-bars, and means for placing a feeder in connection with either of said bus-bars through said resistance.

8. The combination, substantially as described, of bus-bars of different potentials, feeder switches for transferring a feeder from one bus-bar to another, a rheostat or variable resistance, means for connecting the same into circuit between a feeder and either of two bus-bars with which the ends of the resistance are connected, and a circuit breaker for breaking the connection between either end of the resistance and the bus-bar.

9. The combination, substantially as described, of bus-bars of different potentials, a series of feeders and feeder switches for transferring the feeders from one bus bar to another, a variable resistance or rheostat, a switch for connecting either one of a number of feeders to said resistance, means for placing the said resistance in circuit between a feeder and a bus-bar, means for increasing or decreasing said resistance while so connected, and switch devices for breaking the connection of either terminal of the resistance with a bus-bar.

10. The combination of an artificial resistance connected across the bus-bars, means for connecting any feeder terminal to either end of said resistance, and means for breaking the connection of the same end of the resistance with the bus-bar to which the feeder is connected.

11. The combination, substantially as described, of bus-bars of different or graded potential, feeder switches for transferring a feeder from one bus-bar to another, and a galvanometer or voltmeter having one terminal connected to an intermediate potential and the other to a switch adapted to connect with any feeder while the same is connected to any bus-bar.

12. The combination, substantially as described, of a number of sources of different potential, feeders having switches for transferring them from one source to another, means for controlling the potential at a feeder terminal to raise or lower the same gradually prior to transfer, and an electric alarm for giving a signal when the arm of the controller is moved in a direction to connect the feeder terminal directly with a source of different potential.

13. The combination with a number of feeders, of a switch for connecting to any one of them, means for placing the feeder in connection with a potential controller connected to a bus-bar or source of potential the same as or different from the feeder potential, and circuit controlling contacts for the alarms connected respectively to potentials the same as that of the feeder and different therefrom, said contacts being located as described to give an alarm if the devices controlling the feeder connection be moved in the wrong direction.

14. The combination, substantially as described, of bus-bars of different potential, feeders and feeder switches for transferring the feeder from one bus-bar to another, an artificial resistance and galvanometer, means for connecting any feeder through said resistance and galvanometer with a bus-bar while maintaining the connection with the bus-bar from which the feeder is to be switched, and means for varying said artificial resistance prior to the transfer to cause the galvanometer to indicate the same amount of current as that flowing on the feeder.

15. The combination, substantially as described, of the bus-bars of different potentials, the feeders, the consumption circuits, feeder switches for transferring a feeder from one bus-bar to another, a variable rheostat, means for connecting a feeder terminal to one terminal of said rheostat, and a switch controlling the connection of the opposite terminal of the rheostat with different bus-bars, as and for the purpose described.

16. The combination, substantially as described, of bus-bars of graded potential, feeder switches for transferring the feeders from one bus-bar to another, a rheostat permanently connected to the bus-bar of highest potential, means for connecting said resistance to any feeder terminal, and means for varying the resistance of connection and before the shifting of the feeder.

Signed by CYPRIEN O. MAILLOUX, at New York, in the county of New York and State of New York, this 20th day of June, A. D. 1893.

CYPRIEN O. MAILLOUX.

Witnesses:
WM. H. CAPEL,
T. F. CONREY.

Signed by WILLIAM S. BARSTOW, at New York, in the county of New York and State of New York, this 22d day of June, 1893.

WILLIAM S. BARSTOW.

Witnesses:
WM. H. CAPEL,
T. F. CONREY.